United States Patent [19]

Watanabe et al.

[11] Patent Number: 4,892,586

[45] Date of Patent: Jan. 9, 1990

[54] CONCRETE COMPOSITION FOR ROLLER COMPACTED PLACING METHOD

[75] Inventors: Yoshiharu Watanabe; Hisayuki Shimizu; Mineo Ito, all of Niigata, Japan

[73] Assignee: Denki Kagaku Kogyo Kabushiki Kaisha, Tokyo, Japan

[21] Appl. No.: 205,027

[22] Filed: Jun. 3, 1988

Related U.S. Application Data

[63] Continuation of Ser. No. 22,588, Mar. 3, 1987, which is a continuation of Ser. No. 809,991, Dec. 17, 1985, abandoned.

[30] Foreign Application Priority Data

Dec. 26, 1984 [JP] Japan .................. 59-276698

[51] Int. Cl.⁴ ................ C04B 24/00; C04B 24/10
[52] U.S. Cl. ............................. 106/92; 106/90; 106/97; 106/98; 106/95; 106/314; 106/315
[58] Field of Search ............ 106/90, 92, 97, 314, 106/315, 95, 98

[56] References Cited

U.S. PATENT DOCUMENTS

| | | | |
|---|---|---|---|
| 3,782,984 | 1/1974 | Allemand et al. | 106/90 |
| 4,466,834 | 8/1984 | Dodson et al. | 106/314 X |
| 4,511,683 | 4/1985 | Shinohara et al. | 106/90 X |

FOREIGN PATENT DOCUMENTS

| | | |
|---|---|---|
| 2033367 | 5/1980 | United Kingdom . |
| 2058037 | 4/1981 | United Kingdom . |

*Primary Examiner*—William R. Dixon, Jr.
*Assistant Examiner*—Susan Hollenbeck
*Attorney, Agent, or Firm*—Jordan and Hamburg

[57] ABSTRACT

A concrete composition for use in a roller compacted placing method includes a cement, an aggregate, an organic acid and/or a salt thereof and a set accelerating inorganic salt.

16 Claims, No Drawings

CONCRETE COMPOSITION FOR ROLLER COMPACTED PLACING METHOD

This application is a continuation of application Ser. No. 022,588, filed Mar. 3, 1987, which, in turn, is a continuation of application Ser. No. 809,991, filed Dec. 17, 1985, both now abandoned.

BACKGROUND OF THE INVENTION

1. Field of the Invention

The present invention relates to a concrete composition, and more particularly to a concrete composition for roller compacted placing method.

2. Related Art Statement

A roller compacted placing method has been developed in Japan in recent years for placing concrete for the construction of a concrete dam. This method is entirely different from the conventional concrete placing methods in which a cable crane or the like equipment is used, and has been developed to rationalize the operations for constructing a concrete dam while reconsidering systematically all operations including mixing, transporation, placing and compaction of the concrete. More specifically, in the roller compacted placing method, a concrete of dry consistency is transported by damp trucks, spread by bulldozers or wheel loaders, and compacted by rollers or vibrating rollers. This method attracted public attention as a novel economical method, as it had been increasingly used for the construction of main bodies, water cushion rooms and aprons of dams.

The roller compacted placing method is characterized in that the thickness of a concrete layer placed by a single step is increased by as much as 1.5 meters at the most, with an increase in volume of the concrete placed. The volume of concrete placed within an hour by means of the roller compacted placing method reaches 50 to 200 m$^3$, which is larger than that placed by the conventional method, which amounts to about 30 m$^3$ at the most, whereby the construction speed is remarkably increased. Moreover, according to the roller compacted placing method, a concrete containing a smaller quantity of cement per unit volume thereof exhibits a strength comparable to that of a concrete placed by the conventional method and containing a larger quantity of cement per unit volume. Since the content of cement in the concrete placed by the roller compacted placing method is small, the exothermic heat generated therefrom is decreased correspondingly so that the resistance to thermal cracking is improved. Accordingly, the roller compacted placing method is particularly suited for the construction of a massive concrete structure.

A concrete composition containing 120 to 160 kg/m$^3$ of cement and placed by the roller compacted placing method has a strength of 80 to 150 kgf/cm$^3$ (after aging for 3 months), which is comparable to the strength obtainable by a concrete composition containing 200 kg/m$^3$ of cement and placed by the conventional method. Provision of cooling means, such as cooling pipe arrangement, is not necessary when a concrete containing as a low a cement content as 120 kg/m$^3$ is used. A concrete composition which is impoverished in cement may be used within a dam mat or the interior of a main body which is not an important structural portion, or may be used for forming portions which are not subjected to severe abrasion, impact, repeated freezing and thawing or neutralization from the environment.

However, since the dam apron and water cushion room of a dam are subjected to abrasion or impact, at least the surfaces of such portions must be covered by surface layers enriched with cement to provide high strength. The surface layers should have thicknesses so that the concrete composition enriched with cement is not impaired by thermal cracking, or should be cooled by pipe cooling or other proper means to avoid thermal cracking. The task of increasing the strength and the task of decreasing the exothermic heat are the conflicting tasks imposed in placing a concrete compostion to construct a massive structure.

Anyway, in the construction of a dam, more than several hundred thousand cubic meters of concrete are placed. If the content of cement in a unit volume of concrete can be decreased to provide a concrete having a high strength, the exothermic heat generated from the concrete is decreased and the cooling pipe arrangement or other cooling means can be dispensed with. In addition, as the exothermic heat generated from a unit volume of concrete is decreased, the volume or thickness of concrete placeable by a single step is increased with significant economical effect so that the construction speed is increased.

However, the conventional concrete composition used in the roller compacted placing method is prepared simply by adding fly ash and/or a water-reducing agent to a mixture of a cement and an aggregate, and does not provide satisfactory strength without increasing the exothermic heat.

SUMMARY OF THE INVENTION

A primary object of this invention is to provide a concrete composition for the roller compacted placing method, which exhibits a sufficiently high strength without the increase in exothermic heat generated therefrom.

Another object of this invention is to provide a concrete composition for the roller compacted placing method, from which an extremely dry concrete may be produced by decreasing the water content without the increase in exothermic heat generated therefrom.

A further object of this invention is to provide a concrete composition for the roller compacted placing method, which can be placed and solidified without the need of pipe cooling or other cooling means.

A still further object of this invention is to provide a concrete composition for the roller compacted placing method, by the use of which the thickness of the concrete placeable by a single step can be increased.

The above and other objects of this invention will become apparent from the following detailed description of the invention.

According to the present invention, there is provided a concrete composition for a roller compacted placing method, comprising a cement, an aggregate, an organic acid and/or a salt thereof, and a set accelerating inorganic salt.

DETAILED DESCRIPTION OF THE PREFFERED EMBODIMENTS

The present invention will be described in detail hereinafter.

The present invention is characterized by the use of a combination of an organic acid and/or a salt thereof with a set accelerating inorganic salt, whereby the quantity of water required for hydration is decreased to reduce the exothermic heat generated by the hydration reaction and yet to provide a solidified mass having a high strength.

The organic acids or salts thereof, which may be used in the present invention, include hydroxypolycarboxylic acids, such as malic acid, tartaric acid and citric acid; hydroxymonocarboxylic acids, such as heptonic acid, gluconic acid and glycollic acid; saturated or unsaturated carboxylic acids, such as oxalic acid, malonic acid, succinic acid, glutaric acid, adipic acid, maleic acid, fumaric acid and heptanoic acid; salts of these organic acids, such as alkali metal salts, alkali earth metal salts, zinc salts, copper salts, lead salts and iron salts; polymers of carboxylic acids, such as condensation products of acrylic acid and condensation products of maleic acid anhydride; and alkali metal salts and ammonium salts of the polymers of carboxylic acids. Examples of commercially available polymers of carboxylic acids are "Work 500" produced and sold by Nippon Zeon Co., Ltd. and "Apron 6001" produced and sold by Toagosei Chemical Industry Co., Ltd.

These organic acids and/or salts thereof have been well known as retarders for setting or solidification of cements, and some of them are used for retarders for rapid hardening cements. Increase in strength cannot be expected when such an organic acid and/or a salt thereof is added singly.

The amount of the organic acid and/or a salt thereof to be added to the concrete composition of the invention comprises generally not more than 0.5 parts by weight, preferably from 0.05 to 0.3 parts by weight, based on 100 parts by weight of cement in the composition. If more than 0.5 parts by weight of the organic acid and/or a salt thereof is added, the improvement in strength attainable by the present invention is decreased.

The set accelerating inorganic salts, which may be used in combination with the organic acid and/or a salt thereof for the preparation of the concrete composition of the invention, include carbonates, silicates, aluminates and hydroxides of alkali metals, which have been generally used as set accelerating agents for cements. However, when such a set accelerating agent is used singly, the final strength after being aged for 28 days of a concrete composition added with the set accelerating agent is lower than that of a concrete without the addition thereof, although the initial strength is increased by the addition thereof.

The amount of the set accelerating inorganic salt to be added to the concrete composition of the invention may range generally not more than 2 parts by weight, preferably from 0.05 to 1.0 parts by weight, based on 100 parts by weight of cement in the composition. Addition of more than 2 parts by weight of the set accelerating inorganic salt is not preferred, since rapid or false setting may be caused or an improvement in strength may be lessened with increase in exothermic heat by a certain set accelerating inorganic salt.

A water reducing agent may be added to the concrete composition of the invention. By the addition of a water reducing agent, handling ease of the concrete is improved and bleeding of concrete can be suppressed at the spreading step. A concrete having a sufficient workability and having a slump of zero after the lapse of 20 to 30 minutes may be prepared by the addition of a water reducing agent. It is desirous that not more than 5 parts by weight, preferably not more than 3 parts by weight, of a water reducing agent is added to 100 parts by weight of the cement. Examples of the water reducing agent, which may be used in the composition of the invention, include those mainly composed of any of a polysaccharide, an oxycarboxylate, a polyalkylaryl sulfonate, and a polycondensation product of triazine modified with an alkali metal salt of sulfurous acid.

The concrete composition of the invention may be further added with calcium sulfate to increase the strength. Anhydride, hemihydrate and dihydrate of calcium sulfate may be used in an amount of preferably not more than 15 parts by weight when calculated in terms of $CaSO_4$, based on 100 parts by weight of cement. Calcium sulfate is added more preferably an an amount of not more than 10 parts by weight, and most preferably in an amount of 2 to 8 parts by weight, based on 100 parts by weight of cement. If the added amount of calcium sulfate exceeds 15 parts by weight, further increase in strength cannot be expected.

The concrete composition of the invention may be further added with a silica powder to increase the strength. A preferable silica powder is a fine amorphous and spherical powder of silica prepared as a by-product from a furnace for producing a silicon alloy and metallic silicon. It is desirous that 30 parts by weight of such a silica powder be added to 100 parts by weight of cement. The strength of the composition may be increased theoretically as the amount of the added silica powder is increased. However, it is practically preferred that the silica powder be added in an amount of not more than 30 parts by weight, more preferably from 5 to 15 parts by weight, in order to avoid the increase in water content in the resultant concrete and to obviate difficulty in handling the resultant concrete containing a larger amount of silica powder.

The cements, which may be used in the present invention, include various Portland cements such as normal Portland cement, high early strength Portland cement, super high early strength Portland cement, moderate heat Portland cement, white Portland cement and seawater proof Portland cement (Type V); and mixed cements such as silica cement, fly ash cement and blast furnace cement.

The concrete composition for the roller compacted placing method, according to the present invention, has a slump of preferably not more than 3 cm, more preferably not more than 1 cm, and more preferably may be a composition having a vibrating compaction value of from 8 to 30 sec. The concrete composition of the invention has super dry consistency suited for the roller compacted placing method.

The concrete composition of the invention may be prepared by admixing an organic acid and/or a salt thereof, a set accelerating inorganic salt, and optionally with a calcium sulfate and a silica powder at the step of kneading the concrete. The concrete composition of the invention may be placed by transporting by a damp truck, spreading by a bulldozer or a wheel loader, and compacting by a roller or a vibrating roller.

As will be understood from the foregoing, the conflicting tasks of increasing the strength and decreasing the exothermic heat can be solved by the use of the concrete composition of the invention. Although the roller compacted placing method has been developed to construct a dam by rationalized operations, it may be suited for the construction of a road and a runway for an airplane and may also be used for other wide applications.

EXAMPLES OF THE INVENTION

The present invention will now be described more specifically with reference to some Examples thereof.

EXAMPLE 1

Concrete mixtures shown in Table 1 were prepared while varying the kinds and used amounts of organic acids or salts thereof and set accelerating inorganic salts.

TABLE 1

| Mix. No. | G max (mm) | Slump (cm) | Amount of Air (wt %) | S/a (wt %) | W/C (wt %) | Water | Cement | Sand | Gravel | Water Reducing Agent |
|---|---|---|---|---|---|---|---|---|---|---|
| | | | | | | \multicolumn{5}{c}{Unit Amount (kg/m³)} |
| a | 40 | 1.5 ± 1.5 | 1.5 | 32 | 89 | 107 | 120 | 712 | 1531 | 0.36 |
| b | 40 | 1.5 ± 1.5 | 1.5 | 32 | 67 | 107 | 160 | 710 | 1526 | 0.48 |

Note:
G max = Maximum dimension of gravel
S/a = Percentage of sand to aggregate
W/C = Percentage of water to cement
The same applies to the tables shown hereinbelow.

Used Materials

Cement: Normal Portland cement produced by Denki Kagaku Kogyo Kabushiki Kaisha

Sand: River sand obtained from Himekawa, Niigata

Gravel: River gravel obtained from Himekawa, Niigata

Water Reducing Agent: Produced and sold under the Trade Name of "Selflow 110p" by Dai-ichi Kogyo Seiyaku Co., Ltd.

Organic Acids: First-class reagents

Set Accelerating Inorganic Salts: First-class reagents

The compressive strength after being subjected to standard aging for 91 days and temperature rise under the adiabatic condition were measured.

The test specimen was molded by filling a concrete in a mold frame of 15φ×30 cm to a height of 29.5 cm using a table vibrator and by placing a 5 cm thick iron plate on the surface of the concrete and applying a load of 3 kgf/cm² while applying with vibration using rod vibrators from both sides, the molding operation being continued for 3 minutes.

The temperature rise under the adiabatic condition was measured by the use of an adiabatic temperature rise measuring instrument for measuring the temperature of concrete produced by Maruto Seisakusho Co., Ltd.

The results are shown in Table 2.

The test for measuring the adiabatic temperature rise was conducted in a room maintained at 20° C.±2° C., and the result is shown by the temperature rise.

The specified parts by weight of organic acids or salts thereof and set accelerating inorganic salts were added to 100 parts by weight of cement. Used polymers of carboxylic acids were commercially available polymers of carboxylic acids sold under the Trade Name of "Work 500" (produced and sold by Nippin Zeon Co., Ltd) and sold under the Trade Name of "Aron 6001" (produced and sold by Toagosei Chemical Industry Co., Ltd.).

COMPARATIVE EXAMPLE 1

Run Nos. 1 to 3 and 5 in Table 2 were prepared similarly as in Example 1 except in that no organic acid and no set accelerating inorganic salt were added. The results are shown in Table 2.

TABLE 2

| Run No. | Mix. No. | Organic Acid and Salt thereof Kind | Amount Added (Part by weight) | Set Accelerating Agent Kind | Amount Added (Part by weight) | Compressive Strength (kgf/cm²) 91 days | Temperature Raise (°C.) |
|---|---|---|---|---|---|---|---|
| 1 | | — | — | — | — | 86 | 22 |
| 2 | | Citric Acid | 0.15 | — | — | 90 | 20 |
| 3 | a | — | — | Potassium Carbonate | 0.5 | 73 | 25 |
| 4 | | Citric Acid | 0.15 | " | " | 182 | 21 |
| 5 | | — | — | — | — | 142 | 27 |
| 6 | | Sodium Citrate | 0.05 | Sodium Aluminate | 0.5 | 187 | 25 |
| 7 | | | 0.1 | | " | 213 | 24 |
| 8 | | | 0.15 | | " | 256 | 23 |
| 9 | | | 0.3 | | " | 220 | 22 |
| 10 | | | 0.5 | | " | 181 | 20 |
| 11 | | Sodium Gluconate | 0.15 | Sodium Carbonate | 0.05 | 183 | 22 |
| 12 | b | | " | | 0.1 | 208 | 23 |
| 13 | | | " | | 0.3 | 226 | 23 |
| 14 | | | " | | 0.5 | 247 | 24 |
| 15 | | | " | | 1.0 | 201 | 25 |
| 16 | | | " | | 2.0 | 192 | 26 |
| 17 | | Work 500 | 0.05 | Sodium Hydrate | 0.5 | 185 | 25 |
| 18 | | | 0.1 | | " | 202 | 24 |
| 19 | | | 0.15 | | " | 251 | 24 |
| 20 | | | 0.3 | | " | 213 | 22 |
| 21 | | | 0.5 | | " | 182 | 20 |
| 22 | | Malic Acid | 0.15 | Sodium Silicate | 0.5 | 242 | 24 |

TABLE 2-continued

| Run No. | Mix. No. | Organic Acid and Salt thereof Kind | Amount Added (Part by weight) | Set Accelerating Agent Kind | Amount Added (Part by weight) | Compressive Strength (kgf/cm²) 91 days | Temperature Raise (°C.) |
|---|---|---|---|---|---|---|---|
| 23 | | Sodium Malate | " | " | " | 257 | 24 |
| 24 | | Potassium Tartrate | " | " | " | 261 | 23 |
| 25 | | Heptonic Acid | " | " | " | 239 | 23 |
| 26 | | Sodium Heptonate | " | " | " | 243 | 24 |
| 27 | | Calcium Gluconate | " | " | " | 217 | 22 |
| 28 | | Zinc Gluconate | " | " | " | 221 | 20 |
| 29 | | Iron Gluconate | " | " | " | 220 | 20 |
| 30 | b | Lead Gluconate | " | " | " | 200 | · 20 |
| 31 | | Copper Gluconate | " | " | " | 203 | 20 |
| 32 | | Sodium Oxalate | " | " | " | 237 | 23 |
| 33 | | Sodium Malonate | " | " | " | 241 | 25 |
| 34 | | Sodium Succinate | " | " | " | 215 | 26 |
| 35 | | Sodium Glutarate | " | " | " | 209 | 24 |
| 36 | | Sodium Adipate | " | " | " | 212 | 25 |
| 37 | | Sodium Maleate | " | " | " | 236 | 24 |
| 38 | | Sodium Fumarate | " | " | " | 227 | 24 |
| 39 | | Sodium Enanthate | " | " | " | 215 | 23 |
| 40 | | Aron 6001 | " | " | " | 248 | 21 |

As will be seen from the results of Example 1 and Comparative Example 1, although the organic acids and/or salts thereof and the set accelerating inorganic salts do not provide the aimed effect when added singly, the temperature rise due to exothermic heat by the hydration reaction is suppressed and the strength of the solidified concrete composition is increased when an appropriate amount of organic acid and/or salt thereof is used together with an appropriate amount of set accelerating inorganic salt.

For example, comparing the result of Run No. 5 (Comparative Example) with the result of Run No. 6 (Example), the temperature rise in Run No. 6 is smaller than that of Run No. 5 by 2° C. In consideration of the heat capacity of the entire massive concrete, decrease in temperature rise of 1° C. has a significant meaning when a dam is constructed using a large volume of concrete.

EXAMPLE 2

Generally following the procedures as described in Example 1, concrete mixtures similar to Run Nos. 5 and 8 in Table 2 were prepared except that the kind and used amount of calcium sulfate were varied and in that variant amounts of silica flour recovered from a ferrosilicon production furnace were used.

Commercially available calcium sulfate dihydrate and calcium sulfate hemihydrate for industrial use and Type II anhydrous calcium sulfate (Specific Surface Area: 5200 cm²/g) produced as a by-product in a process for the preparation of fluoric acid were used as the calcium sulfate.

The added amount of each calcium sulfate is calculated in terms of CaSO₄, based on 100 parts of weight of cement.

The results are shown in Table 3. Run Nos. 41 to 43 in Table 3 are Comparative Examples.

As will be seen from the results of Example 2 and Comparative Examples, the exothermic heats are decreased and the strength of solidified concretes is increased by the combined use of the calcium sulfate and the silica flour.

TABLE 3

| Run No. | Amount Added (Part by weight) Sodium Citrate | Sodium Aluminate | Kind | Amount Added (Part by weight) | Compressive Strength (91 days) (kgf/cm²) | Temperature Rise (°C.) |
|---|---|---|---|---|---|---|
| 41 | — | — | — | — | 145 | 27 |
| 42 | — | — | Type II Anhydrous Calcium Sulfate | 5 | 152 | 32 |
| 43 | — | — | Silica Flour | 10 | 138 | 26 |
| 44 | 0.15 | 0.5 | Type II Anhydrous Calcium Sulfate | 1 | 273 | 23 |
| 45 | " | " | " | 2 | 338 | 24 |
| 46 | " | " | " | 8 | 358 | 25 |
| 47 | " | " | " | 10 | 318 | 24 |

TABLE 3-continued

| Run No. | Amount Added (Part by weight) | | Kind | Amount Added (Part by weight) | Compressive Strength (91 days) (kgf/cm²) | Temperature Rise (°C.) |
| --- | --- | --- | --- | --- | --- | --- |
| | Sodium Citrate | Sodium Aluminate | | | | |
| 48 | " | " | " | 15 | 298 | 24 |
| 49 | " | " | Calcium Sulfate Hemihydrate | 2 | 306 | 24 |
| 50 | " | " | " | 8 | 338 | 24 |
| 51 | " | " | " | 15 | 270 | 24 |
| 52 | " | " | Salcium Sulfate Dihydrate | 5 | 342 | 25 |
| 53 | " | " | Silica Flour | 3 | 267 | 23 |
| 54 | " | " | " | 5 | 281 | 23 |
| 55 | " | " | " | 15 | 297 | 22 |
| 56 | " | " | " | 20 | 275 | 21 |
| 57 | " | " | " | 30 | 260 | 20 |

EXAMPLE 3

As shown in Table 5, using citric acid, sodium silicate, Type II anhydrous calcium sulfate and a silica flour, concrete mixtures having various compositions (shown in Table 4) were prepared and examined similarly as in Example 1. The results are shown in Table 5.

As will be seen from the results of Example 3, the exothermic heat can be decreased and the strength of the solidified concretes can be increased even when the quantities of cement contained in a unit volume are varied. It should be understood that the quantity of cement contained in a unit volume of concrete may be considerably decreased according to the present invention.

The compositions of Comparative Run No. 59 and Example Run Nos. 62 and 67 are modified such that each composition had a water content per unit volume of 12 kg/m³ and a slump of 10±2 cm, similar to the compositions for the conventional placing method, and the thus modified compositions were molded only by using a conventional vibrator. The results were that the compressive strengths of respective modified compositions were 441 kg.f/cm², 825 kg.f/cm² and 901 kg.f/cm². By comparing the results of Comparative Run No. 59 and Example Run Nos. 62 and 67 with the results of the corresponding modified compositions, the advantageous effects of the roller compacted placing method should be clearly recognized.

TABLE 4

| Mix. No. | G max (mm) | Slump (cm) | Amount of Air (wt %) | S/a (wt %) | W/C (wt %) | Unit Amount (kg/m³) | | | | Water Reducing Agent |
| --- | --- | --- | --- | --- | --- | --- | --- | --- | --- | --- |
| | | | | | | Water | Cement | Sand | Gravel | |
| c | 25 | 1.5 ± 1.5 | 2.0 | 30 | 36.7 | 110 | 300 | 616 | 1454 | 3.6 |
| d | 25 | 1.5 ± 1.5 | 2.0 | 30 | 29.5 | 118 | 400 | 585 | 1380 | 4.8 |
| e | 25 | 1.5 ± 1.5 | 2.0 | 30 | 25.2 | 126 | 500 | 553 | 1305 | 6.0 |

Note:
Water Reducing Agent; Trade Name "MELMENT 10" Powder available from Showa Denko KK
The other components are the same as in Example 1.

TABLE 5

| Run No. | Mix. No. | Amount Added (Part by weight) | | Type II Anhydrous Calcium Sulfate Silica Flour | | Compressive Strength (91 days) (kgf/cm²) | Temperature Rise (°C.) |
| --- | --- | --- | --- | --- | --- | --- | --- |
| | | Citric Acid | Sodium Silicate | | | | |
| 58 | c | — | — | — | | 421 | 43 |
| 59 | d | — | — | — | | 537 | 50 |
| 60 | e | — | — | — | | 715 | 58 |
| 61 | c | 0.10 | 0.3 | Type II Anhydrous Calcium Sulfate | 5 | 815 | 41 |
| 62 | d | 0.10 | 0.3 | " | 5 | 1012 | 47 |
| 63 | e | 0.10 | 0.3 | " | 5 | 1150 | 54 |
| 64 | c | 0.10 | 0.3 | Silica Flour | 10 | 697 | 39 |
| 65 | d | 0.10 | 0.3 | " | 10 | 821 | 45 |
| 66 | e | 0.10 | 0.3 | " | 10 | 937 | 52 |
| 67 | d | 0.10 | 0.3 | Type II Anhydrous Calcium Sulfate Silica Flour | 5 / 10 | 1260 | 48 |

In Table 5, run Nos. 58~60 are comparative runs.

EXAMPLE 4

A road was actually constructed employing the roller compacted placing method. The compositions of the used concretes are set forth in Table 6. Since the workabilities of concretes are not accurate, when the concretes have slumps of not more than 1 cm, the vibrating compaction values (VC value in sec) determined by the Vee-Bee test are shown. The Vee-Bee test was conducted as follows:

Two layers of concrete were put in a vessel for the Vee-Bee test having an inner diameter of 24 cm and an inner height of 20 cm. After each layer was compacted 35 times using a bar, the surface of the upper layer was flattened. A transparent disk was put on the surface of the upper layer and a weight of 20 Kg was put on the disk. The VC value was determined by vibrating the vessel at 3000 cpm (width of vibration of about 1 mm) using the Vee-Bee tester to measure seconds during which mortar in the concrete contacted the overall lower surface of the disk.

The road was separated into twelve sections, each section having a width of 5 m and a length of 10 m. Each of the sections was placed by each of the compositions including a Comparative Example and set forth in Table 6 to form a 30 cm thick plain concrete slab. Each concrete composition was kneaded in a green concrete preparation factory and transported by a truck over a time of an hour, and spread by workers' hands and compacted by using a vibrating roller having a weight of 7 tons similar to the placing of asphalt.

The compressive strength of a $10\phi \times 20$ cm coring specimen of each of the compositions after aging for 28 days was measured, and the bending strength of a 10 cm $\times$ 10 cm $\times$ 40 cm specimen each being cut out from the road slab was measured. The results are shown in Table 7.

The same materials or the materials obtained from the same place of origin as described in Example 1 were used as the cement, sand, gravel (having a $G_{max}$ of 25 mm), water reducing agent, citric acid and potassium carbonate, and the same silica flour and the same Type II anhydrous calcium sulfate as described in Example 2

The lowest temperature and the highest temperature during the aging period were, respectively, 5° C. and 15° C.

Since the water content in a unit volume of a concrete can be reduced to prepare and use a concrete composition of further dried condition, in the practical placing thereof as illustrated in the foregoing examples, the effect of the invention is extensively manifested to show extremely increased strength even when the water/cement ratio is the same as, for example, in Example Run No. 68.

EXAMPLE 5

Generally following the procedures as described in Example 4, Mixture Nos. k and l set forth in Table 8 were placed on a road. The surfaces of the concretes were covered by panels on which a roller travelled without vibration to compact the concrete compositions. Run No. 74 is a Comparative Example.

As seen from the results shown in Table 9, Run No. 74 having a slump of $5\pm1.5$ cm had an extremely low compressive strength of 669 kgf/cm$^2$, and the concrete composition of Run No. 74 was flowed from both sides of the panel during the roller compaction operation to show detrimental performance charcteristics in the placing operation.

TABLE 8

| Mix. No. | G max (mm) | S/a (wt %) | W/C (wt %) | Slump (cm) | Unit Amount (kg/m$^3$) C | W | S | G | Water Reducing Agent | Citric Acid | Sodium Carbonate | II-C$\overline{\text{S}}$ |
|---|---|---|---|---|---|---|---|---|---|---|---|---|
| k | 25 | 40 | 40 | 1.5 ± 1.5 | 300 | 130 | 817 | 1263 | 3.0 | 0.45 | 0.6 | 15 |
| l | 25 | 40 | 40 | 5 ± 1.5 | 300 | 136 | 810 | 1253 | 3.0 | 0.45 | 0.6 | 15 | were used.

TABLE 6

| Mix. No. | G max (mm) | S/a (wt %) | W/C (wt %) | VC Value (Sec) | Slump (cm) | Unit Amount (kg/m$^3$) C | W | S | G | Water Reducing Agent | Citric Acid | Sodium Carbonate | II-C$\overline{\text{S}}$ | SF |
|---|---|---|---|---|---|---|---|---|---|---|---|---|---|---|
| f | 25 | 40 | 27 | 20 ± 5 | 1> | 300 | 81 | 873 | 1325 | 3.0 | 0.45 | 0 | 0 | 0 |
| g | 25 | 40 | 27 | 20 ± 5 | " | 300 | 81 | 873 | 1325 | 3.0 | 0.45 | 0.6 | 0 | 0 |
| h | 25 | 40 | 27.5 | 20 ± 5 | " | 300 | 82.5 | 857 | 1323 | 3.0 | 0.45 | 0.6 | 15 | 0 |
| i | 25 | 40 | 28.2 | 20 ± 5 | " | 300 | 84.6 | 855 | 1319 | 3.0 | 0.45 | 0.6 | 0 | 15 |
| j | 25 | 40 | 28.6 | 20 ± 5 | " | 300 | 85.8 | 838 | 1317 | 3.0 | 0.45 | 0.6 | 15 | 15 |

Note:
VC Value = Vibrating compaction value
C = Cement
W = Water
S = Sand
G = Gravel
II-CS = Type II anhydrous calcium sulfate
SF = Silica flour
The same applies to the tables mentioned below.

TABLE 7

| Run No. | Mix. No. | Section | Measured VC Value (Sec) | Concrete Temp. (°C.) | Strength (28 days) (kgf/cm$^2$) Compressive Strength | Bending Strength |
|---|---|---|---|---|---|---|
| 68 | f | 1 | 21 | 12.0 | 508 | 45 |
| 69 | g | 2 | 22 | 12.0 | 827 | 85 |
| 70 | h | 3 | 20 | 12.0 | 1005 | 118 |
| 71 | i | 4 | 18 | 12.0 | 950 | 101 |
| 72 | j | 5 | 16 | 12.0 | 1210 | 137 |

Note: Compressive strength is an average of five times. Bending strength is an average of three times.

Run No. 68 is a Comparative Example with no special aging, and the placing was effected spontaneously.

TABLE 9

| Run No. | Mix. No. | Section | Measured Slump (cm) | Compressive Strength (28 days) (kgf/cm$^2$) |
|---|---|---|---|---|
| 73 | k | 6 | 2.9 | 853 |
| 74 | l | 7 | 4.7 | 669 |

EXAMPLE 6

Generally following the procedures as described in Example 4, Mixture No. h as set forth in Table 6 was placed on a road while varying the VC value. $10\phi \times 20$ cm test specimens were prepared by coring after aging for 28 days, and subjected to test to learn the compressive strengths and performance characteristics during the processing operations. The results are shown collectively in Table 10. Run No. 79 was compacted only by roller compaction without vibration.

Run Nos. 75 to 78 were excellent in performance characteristics during the processing operations. The surface of the concrete formed by Run No. 79 was undulated a little by the roller.

TABLE 10

| Run No. | G max (mm) | S/a (wt %) | W/C (wt %) | VC Value (Sec) | Slump (cm) | Unit Amount (kg/m³) C | W | S | G | Amount Added (Part by weight) Water Reducing Agent | Citric Acid | Sodium Carbonate | II-C$\bar{S}$ |
|---|---|---|---|---|---|---|---|---|---|---|---|---|---|
| 75 | 25 | 40 | 23.3 | 40 ± 5 | 0> | 300 | 70.0 | 870 | 1343 | 3.0 | 0.45 | 0.6 | 15 |
| 76 | " | " | 27.5 | 20 ± 5 | " | " | 82.5 | 857 | 1323 | " | " | " | " |
| 77 | " | " | 29.3 | 10 ± 5 | " | " | 88.0 | 851 | 1314 | " | " | " | " |
| 78 | " | " | 31.9 | 5 ± 2 | " | " | 95.6 | 843 | 1302 | " | " | " | " |
| 79 | " | " | 38.7 | — | 1.0 ± 1.5 | " | 116 | 821 | 1269 | " | " | " | " |

| Section | Measured VC Value (Sec) | Slump (cm) | Concrete Temp. (°C.) | Compressive Strength (28 days) (kgf/cm²) |
|---|---|---|---|---|
| 8 | 42 | 0 | 12.0 | 1209 |
| 9 | 20 | 0 | 12.0 | 1005 |
| 10 | 12 | 0 | 12.0 | 989 |
| 11 | 6 | 0 | 12.0 | 967 |
| 12 | — | 0.8 | 12.0 | 901 |

EXAMPLE 7

Generally following the procedures as described in Example 3, Mixture No. c set forth in Table 4 was added with citric acid, sodium silicate and Type II anhydrous calcium sulfate to prepare concrete compositions shown in Table 11. The compressive strengths after aging for 91 days and the temperature rises during the aging period of the concrete compositions were measured. The results are shown in Table 11.

TABLE 11

| Run No. | Mix. No. | Amount Added (Part by weight) Citric Acid | Sodium Silicate | II-C$\bar{S}$ | Compressive Strength (91 days) (kgf/cm²) | Temperature Rise (°C.) |
|---|---|---|---|---|---|---|
| 80 |   | — | — | 5 | 531 | 49 |
| 81 |   | 0.02 | 0.3 | 5 | 605 | 48 |
| 82 |   | 0.05 | 0.3 | 5 | 720 | 45 |
| 83 | C | 0.10 | 0.02 | 5 | 557 | 34 |
| 84 |   | 0.10 | 0.05 | 5 | 659 | 35 |
| 85 |   | 0.10 | 0.1 | 5 | 749 | 38 |
| 86 |   | 0.10 | 0.2 | 5 | 857 | 40 |

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A concrete composition for a roller compacted placing method, comprising 100 parts by weight of a cement, an aggregate, from 0.05 to not more than 0.5 parts by weight of an organic acid and/or a salt thereof, from 0.05 to not more than 2 parts by weight of a set accelerating inorganic salt and from 2 to not more than 15 parts by weight of a calcium sulfate when calculated in terms of $CaSO_4$, said cement being selected from the group consisting of Portland cements, mixed cements and mixtures thereof, said mixed cements being selected from the group consisting of silica cement, fly ash cement and blast furnace cement, said organic acid and/or a salt thereof being selected from the group consisting of hydroxypolycarboxylic acids, hydroxymonocarboxylic acids, saturated and unsaturated carboxylic acids, polymers of carboxylic acids, salts of said acids and mixtures thereof, said set accelerating inorganic salt being selected from the group consisting of carbonates, silicates, aluminates and hydroxides of alkali metals and mixtures thereof, wherein said concrete composition has a slump of not more than 3 cm.

2. A concrete composition according to claim 1, wherein said hydroxypolycarboxylic acid is selected from the group consisting of malic acid, tartaric acid, citric acid and mixtures thereof.

3. A concrete composition according to claim 1, wherein said hydroxymonocarboxylic acid is selected from the group consisting of heptonic acid, gluconic acid, glycollic acid and mixtures thereof.

4. A concrete composition according to claim 1, wherein said saturated and unsaturated carboxylic acid is selected from the group consisting of oxalic acid, malonic acid, succinic acid, glutaric acid, adipic acid, maleic acid, fumaric acid, heptanoic acid and mixtures thereof.

5. A concrete composition according to claim 1, wherein said polymer of carboxylic acid is selected from the group consisting of condensation products of acrylic acid, condensation products of maleic acid anhydride and mixtures thereof.

6. A concrete composition according to claim 1, wherein said salt of said acid is selected from the group consisting of alkali metal salts, alkali earth metal salts, ammonium salts, zinc salts, copper salts, lead salts and iron salts and mixtures thereof.

7. A concrete composition according to claim 1, wherein said Portland cement is selected from the group consisting of normal Portland cement, high early strength Portland cement, super high early strength Portland cement, moderate heat Portland cement, white Portland cement, seawater proof Portland cement (Type V) and mixtures thereof.

8. A concrete composition according to claim 1, further comprising a water reducing agent.

9. A concrete composition according to claim 8, wherein 100 parts by weight of said cement is mixed with not more than 5 parts by weight of said water reducing agent.

10. A concrete composition according to claim 8, wherein said water reducing agent is selected from the group consisting of a polysaccharide, an oxycarboxylate, a polyalkylaryl sulfonate, a polycondensation product of triazine modified with an alkali metal salt of sulfurous acid and mixtures thereof.

11. A concrete composition according to claim 1, wherein said calcium sulfate is selected from the group consisting of calcium sulfate anhydride, calcium sulfate hemihydrate, calcium sulfate dihydrate and mixtures thereof.

12. A concrete composition according to claim 1, further comprising a silica powder.

13. A concrete composition according to claim 12, wherein 100 parts by weight of said cement is mixed with not more than 30 parts by weight of said silica powder.

14. A concrete composition according to claim 1, wherein said organic acid and/or salt thereof comprises 0.05 to 0.3 part by weight and said set accelerating inorganic salt comprises 0.05 to 1 part by weight.

15. A roller compacted placing method comprising spreading a concrete composition according to claim 1 on a surface to be covered with concrete and thereafter roller compacting the concrete composition.

16. A roller compacted placing method comprising spreading a concrete composition according to claim 14 on a surface to be covered with concrete and thereafter roller compacting the concrete composition.

* * * * *